(12) United States Patent
Wulff

(10) Patent No.: US 7,696,875 B2
(45) Date of Patent: Apr. 13, 2010

(54) ANTENNA INTERFACES FOR MOBILE RFID READERS

(75) Inventor: Thomas Wulff, No. Patchogue, NY (US)

(73) Assignee: Motorola, Inc., Schaumburg, IL (US)

( * ) Notice: Subject to any disclaimer, the term of this patent is extended or adjusted under 35 U.S.C. 154(b) by 783 days.

(21) Appl. No.: 11/589,916

(22) Filed: Oct. 31, 2006

(65) Prior Publication Data

US 2008/0100451 A1 May 1, 2008

(51) Int. Cl.
*G08B 13/14* (2006.01)
(52) U.S. Cl. .............. 340/572.1; 340/572.4; 340/572.7; 340/10.1; 235/385
(58) Field of Classification Search .............. 340/572.1, 340/572.4, 572.7, 10.1, 10.31, 10.3; 455/422.1, 455/574; 235/385, 472.01, 472.02
See application file for complete search history.

(56) References Cited

U.S. PATENT DOCUMENTS

| | | | | |
|---|---|---|---|---|
| 6,232,870 B1 * | 5/2001 | Garber et al. | .............. | 340/10.1 |
| 6,318,636 B1 * | 11/2001 | Reynolds et al. | ....... | 235/472.01 |
| 6,934,540 B2 * | 8/2005 | Twitchell, Jr. | ............ | 455/422.1 |
| 7,042,358 B2 * | 5/2006 | Moore | ...................... | 340/572.1 |
| 7,133,704 B2 * | 11/2006 | Twitchell, Jr. | ................ | 455/574 |
| 7,161,470 B2 * | 1/2007 | Berquist et al. | .......... | 340/10.31 |
| 7,362,229 B2 * | 4/2008 | Brinton et al. | ............ | 340/572.1 |
| 7,436,303 B2 * | 10/2008 | Tourrilhes et al. | ........ | 340/572.1 |
| 7,504,951 B2 * | 3/2009 | Phipps et al. | ............ | 340/572.7 |
| 7,538,681 B1 * | 5/2009 | Sharma et al. | ........... | 340/572.7 |
| 7,557,714 B2 * | 7/2009 | Roeder et al. | ............ | 340/572.7 |

* cited by examiner

*Primary Examiner*—Davetta W Goins
(74) *Attorney, Agent, or Firm*—Michael Giannetta; Bartholomew DiVita

(57) ABSTRACT

Methods, systems, and apparatuses for communicating with radio frequency identification (RFID) tags using an RFID reader are provided. A first communication signal configured to communicate with at least one RFID tag is generated. The first communication signal is transmitted from a first antenna of the reader. The reader is docked with a docking station, the docking station including a contact member coupled to at least one additional antenna, enabling the reader to couple a second communication signal through the contact member to the at least one additional antenna.

33 Claims, 10 Drawing Sheets

ANTENNA INTERFACES FOR MOBILE RFID READERS

BACKGROUND OF THE INVENTION

1. Field of the Invention

The present invention relates to wireless communications, and more particularly, to radio frequency identification (RFID) communication systems including RFID readers that communicate with RFID tags.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored wirelessly by devices known as "readers." Readers typically have one or more antennas transmitting radio frequency signals to which tags respond. Since the reader "interrogates" RFID tags, and receives signals back from the tags in response to the interrogation, the reader is sometimes termed as "reader interrogator" or simply "interrogator".

In a RFID system, typically a reader transmits a continuous wave (CW) or modulated radio frequency (RF) signal to a tag. The tag receives the signal, and responds by modulating the signal, "backscattering" an information signal to the reader. The reader receives signals back from the tag, and the signals are demodulated, decoded and further processed.

With the maturation of RFID technology, efficient communications between tags and readers has become a key enabler in supply chain management, especially in manufacturing, shipping, and retail industries, as well as in building security installations, healthcare facilities, libraries, airports, warehouses etc.

RFID readers tend to be expensive, and may be required to be set up in numerous areas to provide necessary coverage of tags. Thus, in a given facility, a large number of readers may be needed to be purchased to provide full coverage. What is needed are ways of providing RFID reader coverage to all desired areas of RFID enabled facilities, while reducing overall RFID system costs.

BRIEF SUMMARY OF THE INVENTION

Methods, systems, and apparatuses for mobile RFID readers and antenna systems, and for ways of interfacing mobile readers with antenna systems are described. In an aspect, a mobile reader includes an antenna for communicating with RFID tags. The mobile reader further includes an interface for coupling to an external antenna system. The mobile reader is configured to communicate with tags using the external antenna system, when coupled thereto.

In a first aspect, a reader includes a first antenna, an antenna interface coupled to the first antenna, a transceiver, a docking interface, and a housing. The transceiver is coupled to the antenna interface. The transceiver is configured to generate a communication signal to communicate with at least one RFID tag. The docking interface is coupled to the antenna interface. The docking interface is configured to detachably interface the reader with a docking station. The docking station includes a contact member coupled to at least one additional antenna. The housing contains the transceiver, the antenna interface, and the docking interface. The docking interface is accessible at an external surface of the housing.

In an aspect, the antenna interface is configured to couple the communication signal to the first antenna when the reader is detached from the docking station, to enable the first antenna to transmit the communication signal. In another aspect, the antenna interface is configured to couple the communication signal to the contact member when the docking interface is interfaced with the docking station to enable the at least one additional antenna to transmit the communication signal.

In another aspect of the present invention, an antenna system includes at least one antenna, an electrical signal link coupled to the at least one antenna, and a docking station. The docking station is configured to detachably interface with a handheld reader. The docking station includes a first contact member coupled to the electrical signal link. The docking station is configured to couple the first contact member to a second contact member of the handheld reader when the docking station is interfaced with the handheld reader.

In one aspect, the docking station and the at least one antenna may be mounted to at least one immobile object. In an alternative aspect, the docking station and the at least one antenna are mounted to a mobile object, such as a forklift or truck.

In another aspect of the present invention, a method for communicating with radio frequency identification (RFID) tags using an RFID reader is provided. A first communication signal configured to communicate with at least one RFID tag is generated by the reader. The first communication signal is transmitted from a first antenna of the reader. The reader is docked with a docking station, the docking station including a contact member coupled to at least one additional antenna, enabling the reader to couple a second communication signal through the contact member to the at least one additional antenna.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
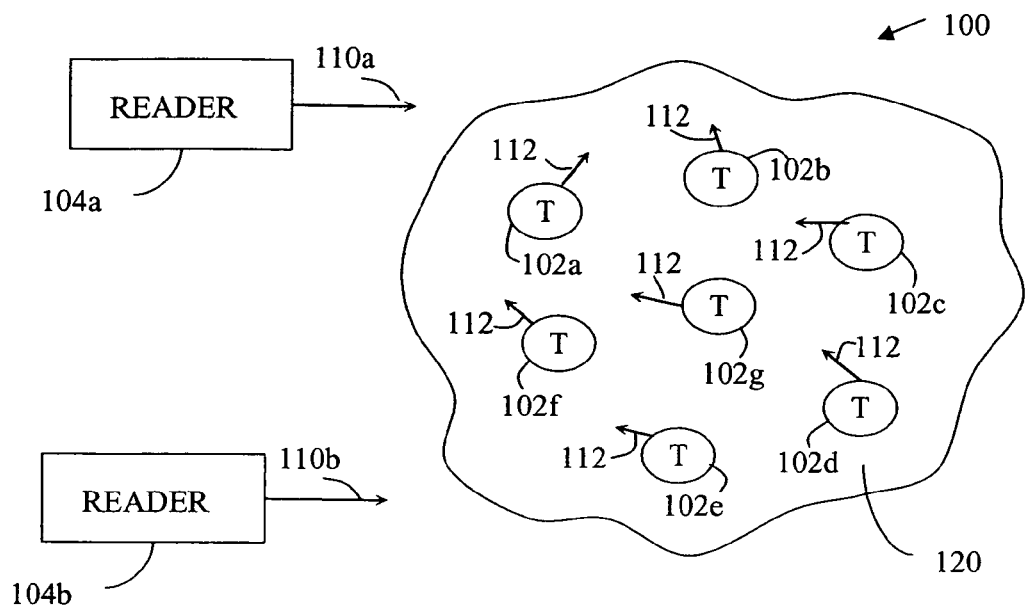
FIG. 1 shows an environment where RFID readers communicate with an exemplary population of RFID tags.

FIGS. 11, 12A, 12B, 13A, 13B, and 14 show example RFID communication environments, according to embodiments of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent data for purposes of illustration only. Data described herein can be represented by either bit value (and by alternative voltage values), and embodiments described herein can be configured to operate on either bit value (and any representative voltage value), as would be understood by persons skilled in the relevant art(s).

Example RFID System Embodiment

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network.

As shown in FIG. 1, reader 104a transmits an interrogation signal 110 having a carrier frequency to the population of tags 120. Reader 104b transmits an interrogation signal 110b having a carrier frequency to the population of tags 120. Readers 104a and 104b typically operate in one or more of the frequency bands allotted for this type of RF communication. For example, frequency bands of 860-9960 MHz, including 902-928 MHz, and 2400-2483.5 MHz have been defined for certain RFID applications by the Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred to herein as backscatter modulation. Readers 104a and 104b receive and obtain data from response signals 112, such as an identification number of the responding tag 102. In the embodiments described herein, a reader may be capable of communicating with tags 102 according to any suitable communication protocol, including Class 0, Class 1, EPC Gen 2, other binary traversal protocols and slotted aloha protocols, any other protocols mentioned elsewhere herein, and future communication protocols.

Figure 2:
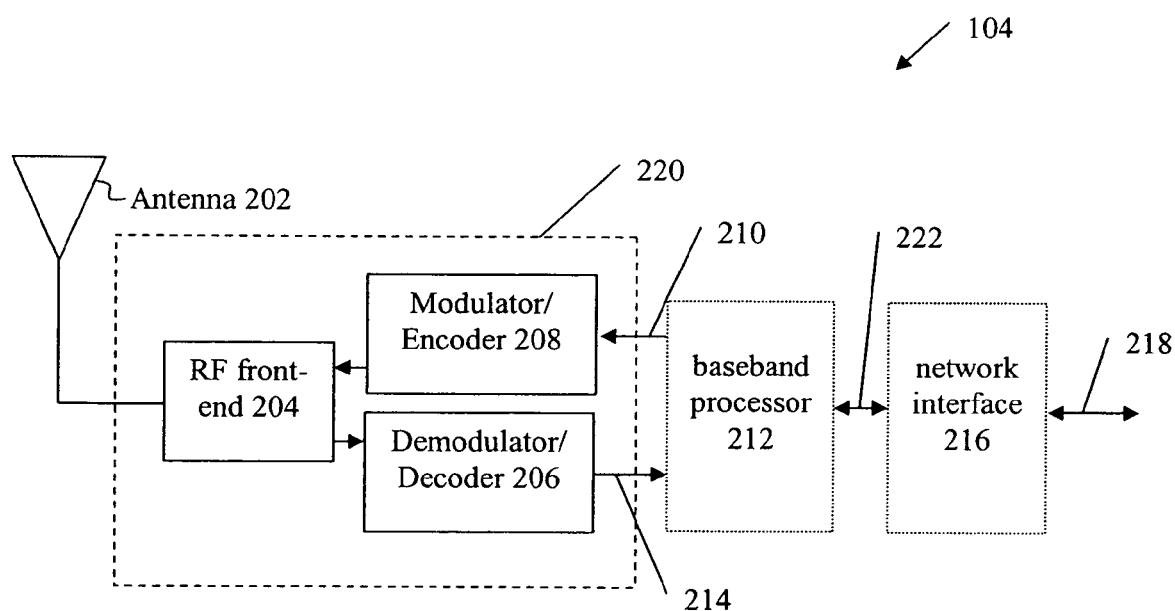
FIG. 2 shows a block diagram of receiver and transmitter portions of an RFID reader.

FIG. 2 shows a block diagram of an example RFID reader 104. Reader 104 includes one or more antennas 202, a receiver and transmitter portion 220 (also referred to as transceiver 220), a baseband processor 212, and a network interface 216. These components of reader 104 may include software, hardware, and/or firmware, or any combination thereof, for performing their functions.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Reader 104 has at least one antenna 202 for communicating with tags 102 and/or other readers 104. Antenna(s) 202 may be any type of reader antenna known to persons skilled in the relevant art(s), including a vertical, dipole, loop, Yagi-Uda, slot, or patch antenna type. For description of an example antenna suitable for reader 104, refer to U.S. Ser. No. 11/265,143, filed Nov. 3, 2005, titled "Low Return Loss Rugged RFID Antenna," now pending, which is incorporated by reference herein in its entirety.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation request 210, and is coupled to an input of RF front-end 204. Modulator/encoder 208 encodes interrogation request 210 into a signal format, modulates the encoded signal, and outputs the modulated encoded interrogation signal to RF front-end 204. For example, pulse-interval encoding (PIE) may be used in a Gen 2 embodiment. Furthermore, double sideband amplitude shift keying (DSB-ASK), single sideband amplitude shift keying (SSB-ASK), or phase-reversal amplitude shift keying (PR-ASK) modulation schemes may be used in a Gen 2 embodiment. Note that in an embodiment, baseband processor 212 may alternatively perform the encoding function of modulator/encoder 208.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214. Note that in an embodiment, baseband processor 212 may alternatively perform the decoding function of demodulator/decoder 206.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as would be known to persons skilled in the relevant art(s).

Figure 3:
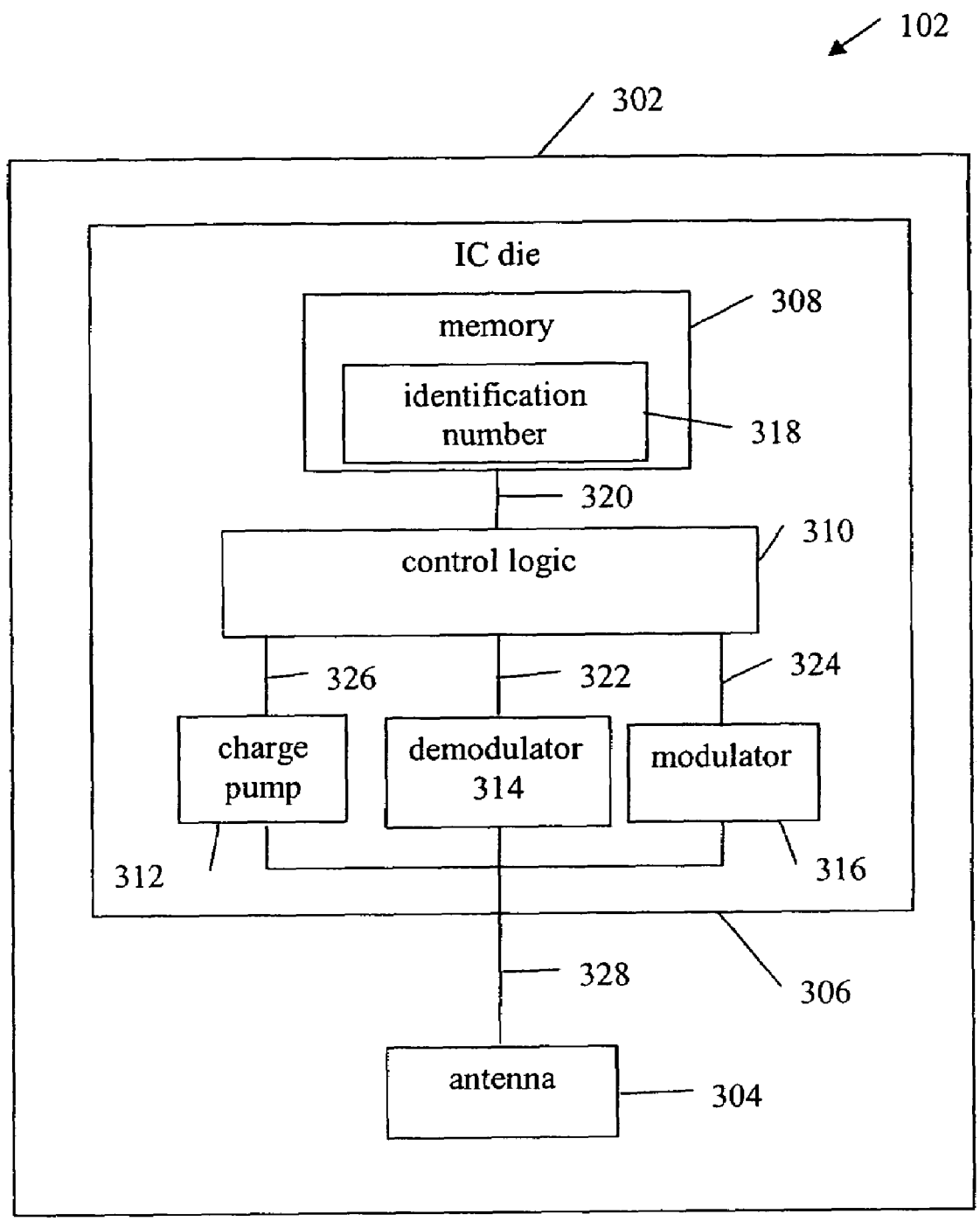
FIG. 3 shows a block diagram of an example radio frequency identification (RFID) tag.

The present invention is applicable to any type of RFID tag. FIG. 3 shows a plan view of an example radio frequency identification (RFID) tag 102. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including dipole, loop, slot, or patch antenna type. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304. In the example embodiment of FIG. 3, IC 306 includes a memory 308, a control logic 310, a charge pump 312, a demodulator 314, and a modulator 316. An input of charge pump 312, an input of demodulator 314, and an output of modulator 316 are coupled to antenna 304 by antenna signal 328. Note that in the present disclosure, the terms "lead" and "signal" may be used interchangeably to denote the connection between elements or the signal flowing on that connection.

Memory 308 is typically a non-volatile memory, but can alternatively be a volatile memory, such as a DRAM. Memory 308 stores data, including an identification number 318. Identification number 318 typically is a unique identifier (at least in a local environment) for tag 102. For instance, when tag 102 is interrogated by a reader (e.g., receives interrogation signal 110 shown in FIG. 1), tag 102 may respond with identification number 318 to identify itself. Identification number 318 may be used by a computer system to associate tag 102 with its particular associated object/item.

Demodulator 314 is coupled to antenna 304 by antenna signal 328. Demodulator 314 demodulates a radio frequency communication signal (e.g., interrogation signal 110) on antenna signal 328 received from a reader by antenna 304. Control logic 310 receives demodulated data of the radio frequency communication signal from demodulator 314 on input signal 322. Control logic 310 controls the operation of RFID tag 102, based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112, which is received by reader 104. In an embodiment, modulator 316 includes a switch, such as a single pole, single throw (SPST) switch. The switch changes the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art(s).

Modulator 316 and demodulator 314 may be referred to collectively as a "transceiver" of tag 102.

Charge pump 312 is coupled to antenna 304 by antenna signal 328. Charge pump 312 receives a radio frequency communication signal (e.g., a carrier signal transmitted by reader 104) from antenna 304, and generates a direct current (DC) voltage level that is output on a tag power signal 326. Tag power signal 326 is used to power circuits of IC die 306, including control logic 320.

In an embodiment, charge pump 312 rectifies the radio frequency communication signal of antenna signal 328 to create a voltage level. Furthermore, charge pump 312 increases the created voltage level to a level sufficient to power circuits of IC die 306. Charge pump 312 may also include a regulator to stabilize the voltage of tag power signal 326. Charge pump 312 may be configured in any suitable way known to persons skilled in the relevant art(s). For description of an example charge pump applicable to tag 102, refer to U.S. Pat. No. 6,734,797, titled "Identification Tag Utilizing Charge Pumps for Voltage Supply Generation and Data Recovery," which is incorporated by reference herein in its entirety. Alternative circuits for generating power in a tag are also applicable to embodiments of the present invention.

It will be recognized by persons skilled in the relevant art(s) that tag 102 may include any number of modulators, demodulators, charge pumps, and antennas. Tag 102 may additionally include further elements, including an impedance matching network and/or other circuitry. Embodiments of the present invention may be implemented in tag 102, and in other types of tags.

Embodiments described herein are applicable to all forms of tags, including tag "inlays" and "labels." A "tag inlay" or "inlay" is defined as an assembled RFID device that generally includes an integrated circuit chip (and/or other electronic circuit) and antenna formed on a substrate, and is configured to respond to interrogations. A "tag label" or "label" is generally defined as an inlay that has been attached to a pressure sensitive adhesive (PSA) construction, or has been laminated, and cut and stacked for application. One form of a "tag" is a tag inlay that has been attached to another surface, or between surfaces, such as paper, cardboard, etc., for attachment to an object to be tracked, such as an article of clothing, etc.

Example embodiments of the present invention are described in further detail below. Such embodiments may be implemented in the environments, readers, and tags described above, and/or in alternative environments and alternative RFID devices.

Example Embodiments

Methods, systems, and apparatuses for mobile RFID readers and antenna systems, and for ways of interfacing mobile readers with antenna systems are described. In an embodiment, a mobile reader includes an antenna for communicating with RFID tags. The mobile reader further includes an interface for coupling to an external antenna system. The mobile reader is configured to communicate with tags using the external antenna system, when coupled thereto. These embodiments can be implemented in any type of RFID reader and/or other RFID device, including those described above and otherwise known.

The example embodiments described herein are provided for illustrative purposes, and are not limiting. The examples described herein may be adapted to any type of tag and reader. Further structural and operational embodiments, including modifications/alterations, will become apparent to persons skilled in the relevant art(s) from the teachings herein.

Figure 4:
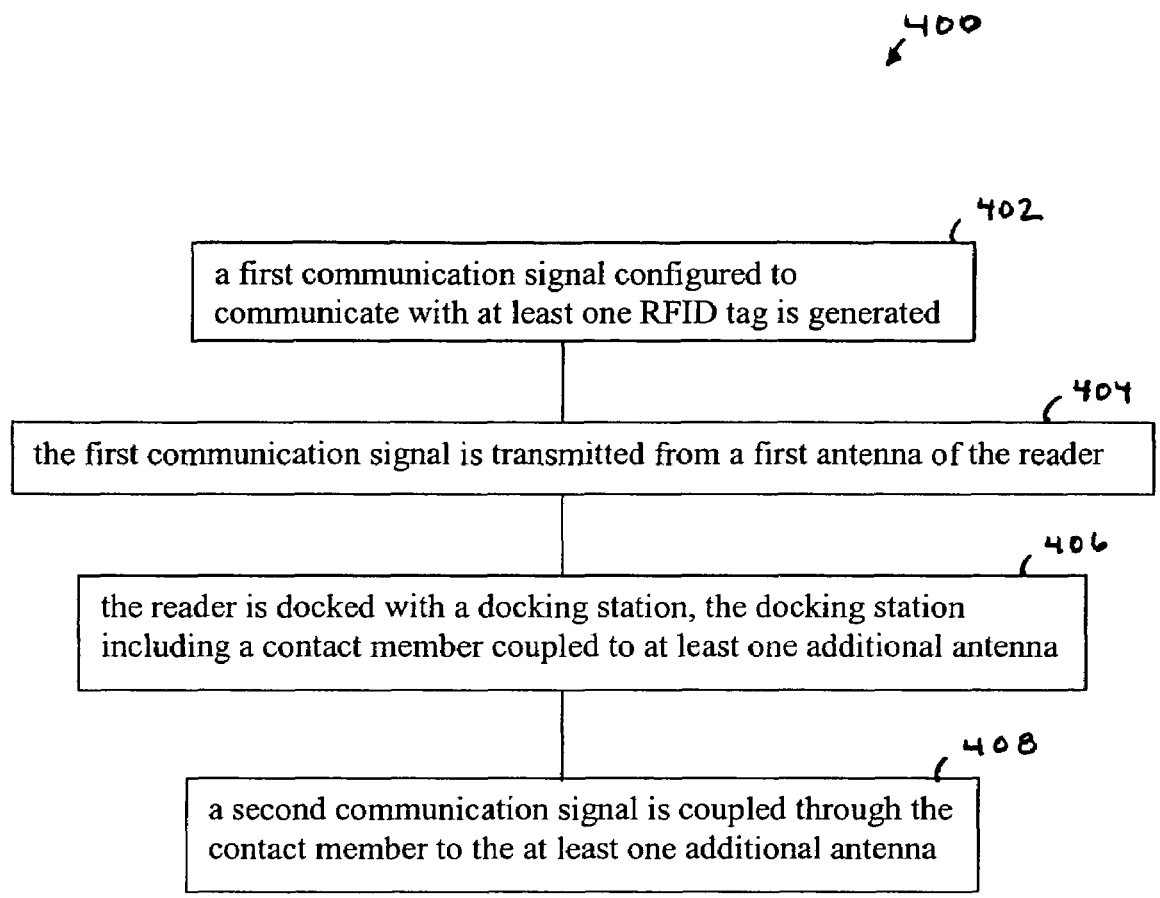
FIG. 4 shows a flowchart providing example steps for operating a reader, according to an example embodiment of the present invention.

FIG. 4 shows a flowchart 400 providing example steps for operating a reader, according to an example embodiment of the present invention. Other structural and operational embodiments will be apparent to persons skilled in the relevant art(s) based on the following discussion. For illustrative purposes, the steps of flowchart 400 are described in detail below with regard to FIGS. 5-10, which show example RFID readers and environments in which the process of flowchart 400 may be implemented.

Figure 5:
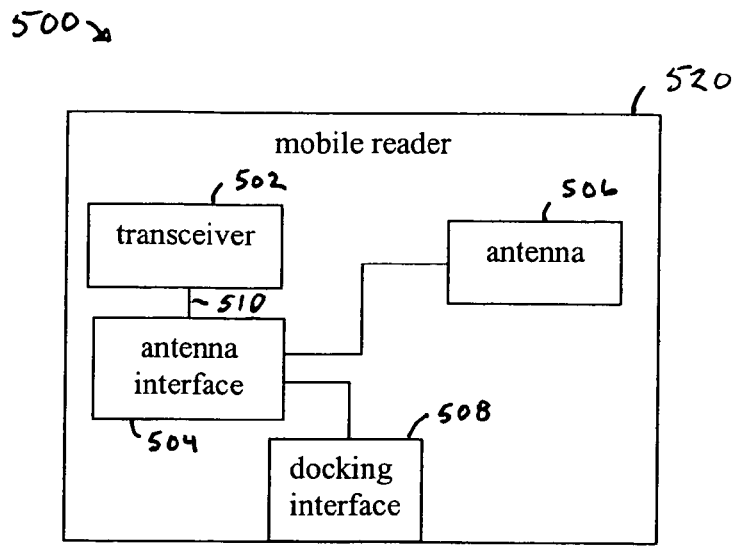
FIGS. 5 and 6 show block diagrams of example mobile readers, according to embodiments of the present invention.

FIG. 5 shows a block diagram of an example mobile reader 500 having a transceiver 502, according to an embodiment of the present invention. As shown in FIG. 5, reader 500 includes transceiver 502, antenna interface 504, an antenna 506, and a docking interface 508, which are housed by a housing 520. Transceiver 502 may be configured similarly to receiver and transmitter portion 220 shown in FIG. 2, or may be otherwise configured. Antenna 506 may be similar to antenna 202 shown in FIG. 2, or may be otherwise configured, to include one or more antennas. Reader 500 may include further elements, such as shown above for reader 104 in FIG. 2. However, further elements are not shown or described with respect to FIG. 5 for reasons of brevity.

As shown in FIG. 5, antenna interface 504 receives a generated communication signal 510 from transceiver 502. Antenna interface 502 is configured to couple signal 510 to antenna 506 and/or docking interface 508, as further described below. For example, antenna interface 502 may include a switch or other selectable coupling mechanism for selectively coupling signal 510 to antenna 506 and/or docking interface 508, as would be known to persons skilled in the relevant art(s). In an embodiment, antenna interface 502 includes a wire or cable connection from transceiver 502 that is split (e.g., by a splitter) to provide a connection to each of antenna 506 and docking interface 508. In embodiments, antenna interface 504 and docking interface 508 may overlap.

Docking interface 508 is configured to detachably interface reader 500 with a docking station. Docking interface 508 may include any suitable type of docking mechanism for docking a handheld mobile device with a docking station, as would be known to persons skilled in the relevant art(s). For example, docking interface 508 may be configured to interface reader 500 with a cradle-type docking station.

Housing 520 contains transceiver 502, antenna interface 504, and docking interface 508. Docking interface 508 is accessible at an external surface of housing 520, so that docking interface 508 may couple reader 500 to a docking station. Antenna 506 may be mounted to housing 520 externally or internally.

Figure 6:
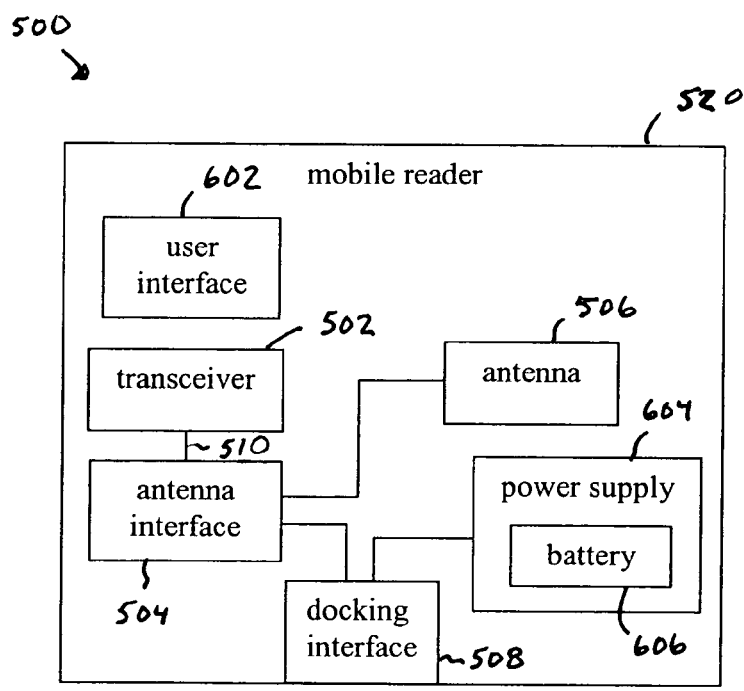

Reader 500 can include a variety of further elements, and combinations thereof, as desired for a particular application. For example, FIG. 6 shows another block diagram of reader 500, including further elements, according to an embodiment of the present invention. As shown in FIG. 6, reader 500 further includes a user interface 602 and a power supply 604. User interface 602 may include any type and number of user interface elements to enable a user to interact with reader 500, as would be known to persons skilled in the relevant art(s), including a finger-trigger mechanism, a keyboard, a graphical user interface (GUI), a display, and/or a voice activated mechanism.

As shown in FIG. 6, power supply 604 may optionally include a battery 606, to enhance mobility of reader 500. Alternatively, or in addition, power supply 604 may include a power cord interface, for interfacing with a power cord that may be connected to a power source, such as a DC or an A/C current source. In another embodiment, power supply 604 may be configured to receive a charging signal for battery 606 through docking interface 508 from a docking station, when reader 500 is docked.

Flowchart 400 shown in FIG. 4 begins with step 402. In step 402, a first communication signal configured to communicate with at least one RFID tag is generated. For example, the first communication signal may be similar to interrogation signal 110 generated by reader 104a shown in FIG. 1. In an embodiment, the first communication signal is generated by transceiver 502 of reader 500 shown in FIG. 5.

Figure 7:
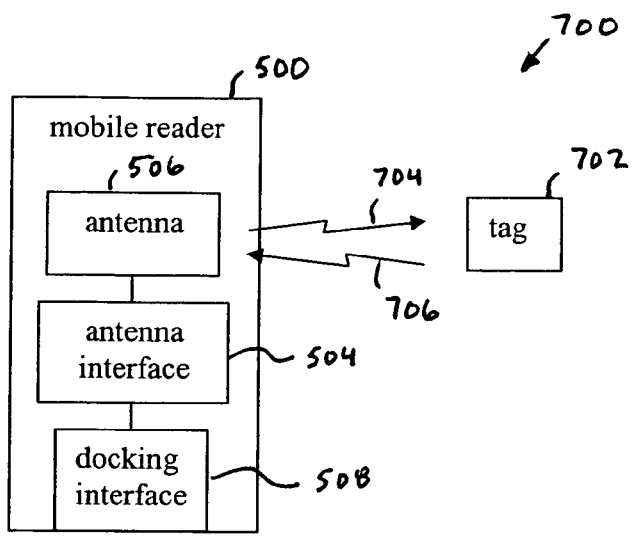
FIGS. 7 and 8 show example RFID communication systems, according to example embodiments of the present invention.

In step 404, the first communication signal is transmitted from a first antenna of the reader. For example, the first communication signal may be transmitted by antenna 506 from reader 500. FIG. 7 shows an RFID communication system 700, where reader 500 communicates with a tag 702, according to an example embodiment of the present invention. As shown in FIG. 7, antenna 506 of reader 500 transmits a first communication signal 704 to one or more tags, such as tag 702. Tag 702 may receive and respond to first communication signal 704, such as by transmitting a response signal 706. Response signal 706 may be similar to a response signal 112 transmitted by each of tags 102a-102f as shown in FIG. 1, for example. Response signal 706 may be received by antenna 506, and coupled to transceiver 502, to be received by reader 500.

Figure 8:
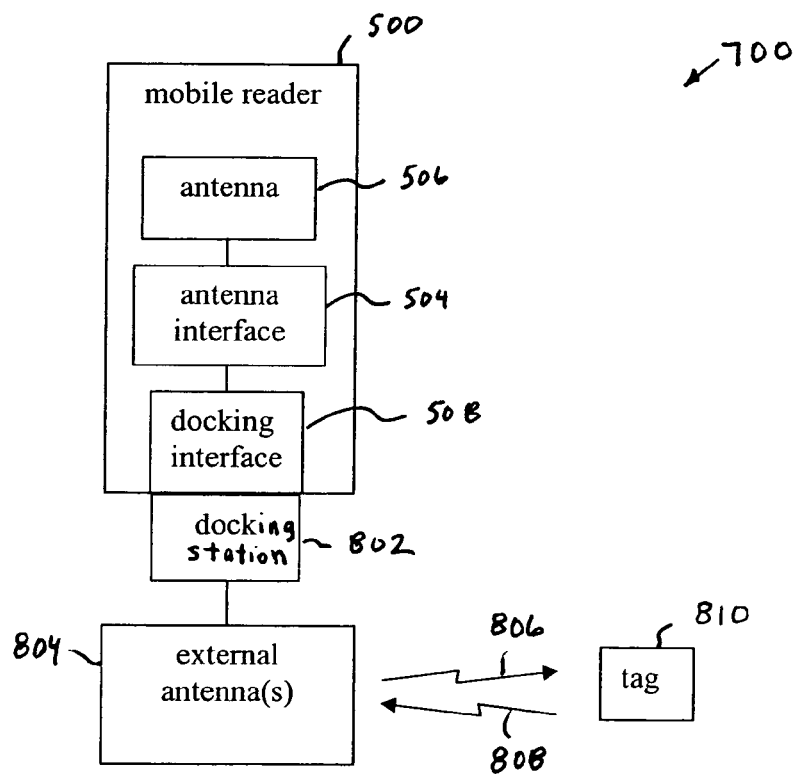
Figure 9:
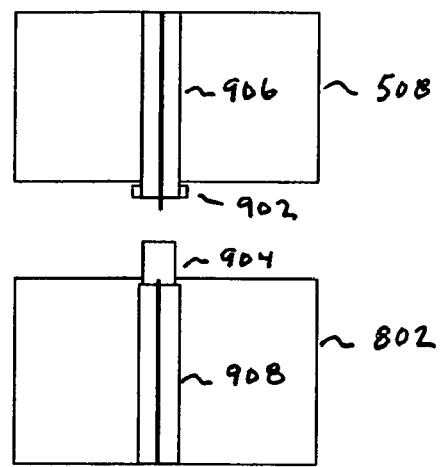
FIG. 9 shows an example docking interface and an example docking station, according to an embodiment of the present invention.

In step 406, the reader is docked with a docking station, the docking station including a contact member coupled to at least one additional antenna. For example, FIG. 8 shows RFID communication system 700, where mobile reader 500 is docked with a docking station 802, according to an example embodiment of the present invention. As shown in FIG. 8, docking station 802 is coupled to one or more external antennas 804 (i.e., not part of mobile reader 500, not mounted to housing 506). Docking station 802 includes one or more electrical contacts such that when docking interface 508 is interfaced with docking station 802, reader 500 is enabled to transmit communication signals from external antennas 804. The electrical contact(s) of docking station 802 are coupled with corresponding electrical contact(s) of docking interface 802 when they are interfaced by docking. Any suitable type of electrical contact types may be present to form an electrical connection between docking interface 508 and docking station 802. For example, as shown in FIG. 9, docking interface 508 and docking station 802 may each include a respective one of first and second coaxial connectors 902 and 904 (e.g., male and female) of corresponding coaxial cables 906 and 908. First and second coaxial connectors 902 and 904 are mated when docking interface 508 and docking station 802 are interfaced, forming a coaxial cable connection between reader 500 and external antennas 804. In this manner, an RF signal generated by transceiver 502 of reader 500 can be transmitted over the coaxial connection from reader 500 to external antennas 804.

In step 408, a second communication signal is coupled through the contact member to the at least one additional antenna. As described above, antenna interface 504 selectively couples generated communication signal 510 to antenna 506 and/or docking interface 508. Antenna interface 504 is configured to selectively couple generated communication signal 510 based on whether reader 500 is interfaced with docking station 802. When reader 500 is detached from docking station 802 (not docked), such that docking interface 508 and docking station 802 are not interfaced, antenna interface 504 couples generated communication signal 510 to antenna 506. Thus, antenna 506 is enabled to transmit first communication signal 704.

When reader 500 is interfaced with docking station 802 (docked), such that docking interface 508 and docking station 802 are coupled, antenna interface 504 is configured to couple generate communication signal 510 to docking station 802. In this manner, external antennas 804 are enabled to transmit a second communication signal 806 to tags, such as tag 810. Tag 810 may receive and respond to second communication signal 806, such as by transmitting a response signal 808. Response signal 808 may be similar to a response signal 112 transmitted by each of tags 102a-102f as shown in FIG. 1, for example. Response signal 808 may be received by external antennas 804, and coupled to transceiver 502, to be received by reader 500.

In one embodiment, when reader 500 is interfaced with docking station 802 (docked), antenna interface 504 couples generated communication signal 510 to docking station 802, but does not couple generated communication signal 510 to antenna 506. In such an embodiment, antenna 506 does not transmit first communication signal 704, while external antennas 804 transmit second communication signal 806. In such an embodiment, antenna interface 504 may include a single pole double throw (SPDT) type switch to switch between antenna 506 and docking station 802, for example.

In another embodiment, when reader 500 is interfaced with docking station 802 (docked), antenna interface 504 couples generated communication signal 510 to docking station 802 and to antenna 506. Thus, in such an embodiment, antenna 506 transmits first communication signal 704 and external antennas 804 transmit second communication signal 806. In such an embodiment, antenna interface 504 may include a single pole single throw (SPST) type switch to couple or decouple signal 510 with docking station 802, for example.

After step 408, reader 500 may be detached from docking station 802. Antenna interface 504 couples generated communication signal 510 to antenna 506. Thus, antenna 506 is enabled to transmit another communication signal. Reader 500 can be subsequently interfaced with one or more docking stations 802 to again be enabled to transmit communication signals through external antennas, if desired.

As described above, antenna interface 502 may include a switch or other selectable coupling mechanism for selectively coupling signal 510 to antenna 506 and/or to docking interface 508, as would be understood to persons skilled in the relevant art(s). For example, in an embodiment, docking interface 508 may include a push-to-make or push-to-break type switch, so that when reader 500 is inserted in docking station 802, signal 510 is coupled to external antennas 804.

Figures 10A, 10B:
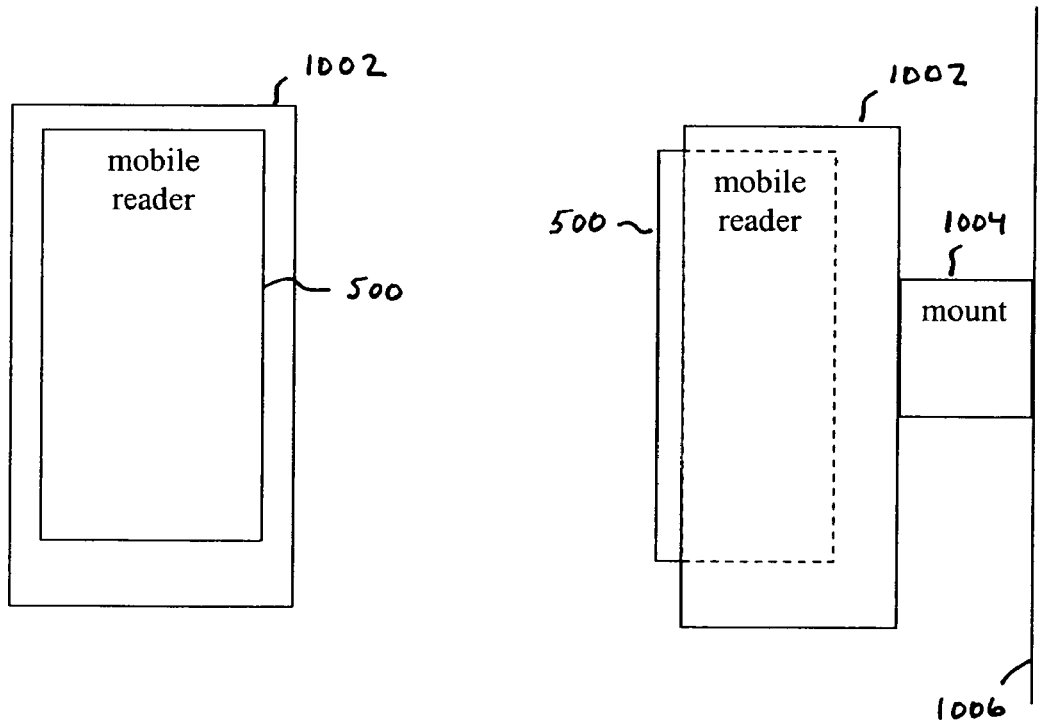
FIGS. 10A and 10B show front and side views of a generally rectangular shaped mobile reader docked in an example cradle-type docking station, according to an embodiment of the present invention.

As described above, docking interface 508 may include any suitable type of docking mechanism for docking with a docking station, as would be known to persons skilled in the relevant art(s). For example, FIGS. 10A and 10B show front and side views of a generally rectangular shaped mobile reader 500 docked in an example cradle-type docking station 1002 version of docking station 802. An optional mount 1004 attaches docking station 802 to a surface 1006. Mount 1004 may be configured to insulate reader 500 from vibration of surface 1006, such as when surface 1006 is a surface of a mobile structure. Surface 1006 may be surface of a mobile or non-mobile structure. Cradle-type docking station 1002 may be configured to conform to reader 500, including sealing edges of reader 500 to provide environmental protection. Reader 500 may have other shapes, and docking station 1002 may be otherwise configured in order to interface with reader 500.

Figure 11:
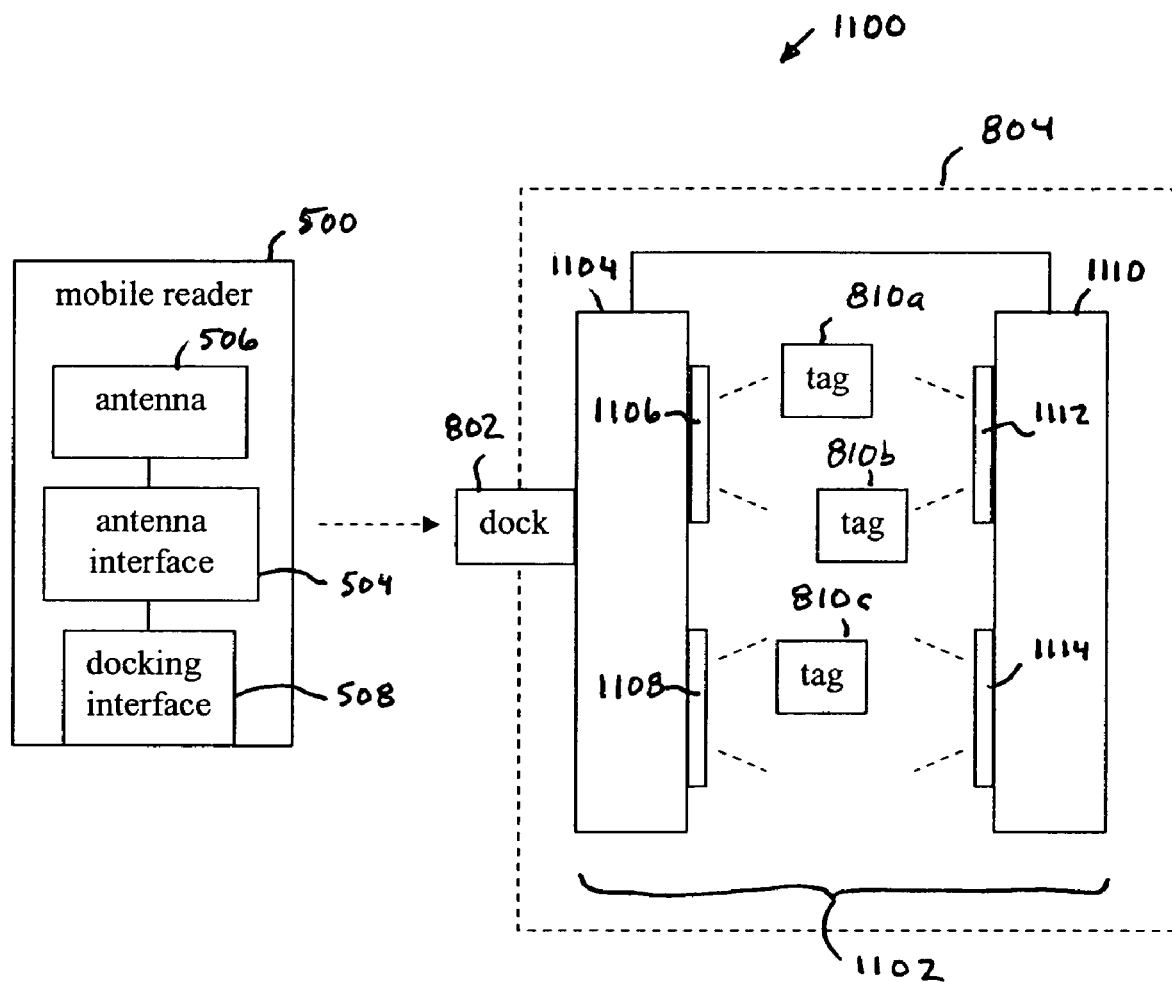

External antenna(s) 804 includes one or more antennas configured to transmit RFID communication signals. The antennas of external antennas 804 may be configured in any combination of orientations and locations. For example, FIG. 11 shows an RFID communication system 1100, according to an example embodiment of the present invention. In FIG. 11, reader 500 is configured to be detachably coupled with docking station 802 to access external antennas 804, which are configured in an example portal coverage configuration 1102. A first array of antennas 1104 mounts a first pair of antennas 1106 and 1108. A second array of antennas 1110 mounts a second pair of antennas 1112 and 1114. In an example implementation, first array of antennas 1104 may be mounted to a first side and second array of antennas 1106 may be mounted to a second side of a portal, such as a doorway, hallway, loading dock entrance, etc. In this manner, tags, such as tags 810a-810c, that pass through the portal may be read.

When mobile reader 500 is not coupled with docking station 802, reader 500 may be used by an operator to read tags within a read coverage area of antenna 506. The operator may carry mobile reader 500 from place to place as needed to read tags. When mobile reader 500 is docked with docking station 802, reader 500 is coupled to antennas 1106, 1108, 1112, and 1114. Thus, when docked, reader 500 may transmit communications signals from antennas 1106, 1108, 1112, and 1114 to read tags within a read coverage area of antennas 1106, 1108, 1112, and 1114.

Note that antennas of external antennas 804 may be coupled to reader 500 and/or each other in any manner by an electrical signal link. For example, a coaxial cable may couple docking station 802 to antennas 1106, 1108, 1112, and 1114 in a daisy chain or star configuration, with proper impedance matching and terminations provided.

Figure 12A:
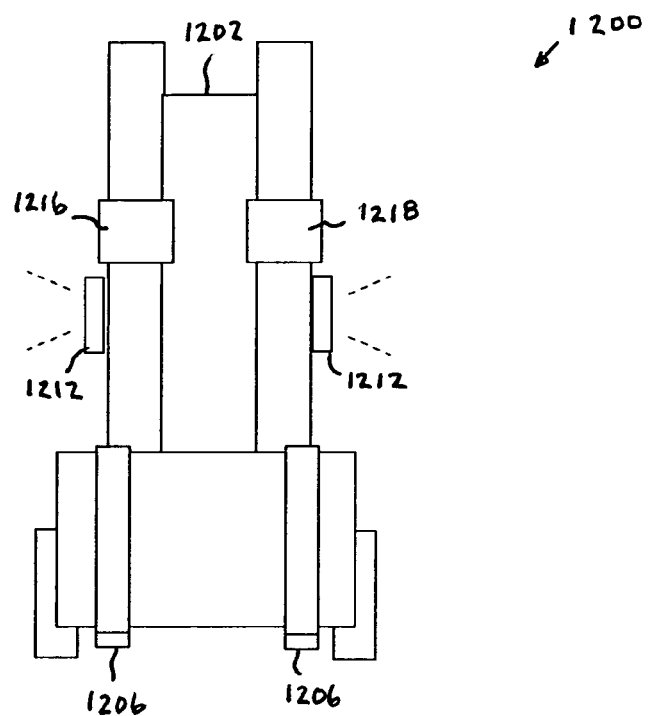
Figure 12B:
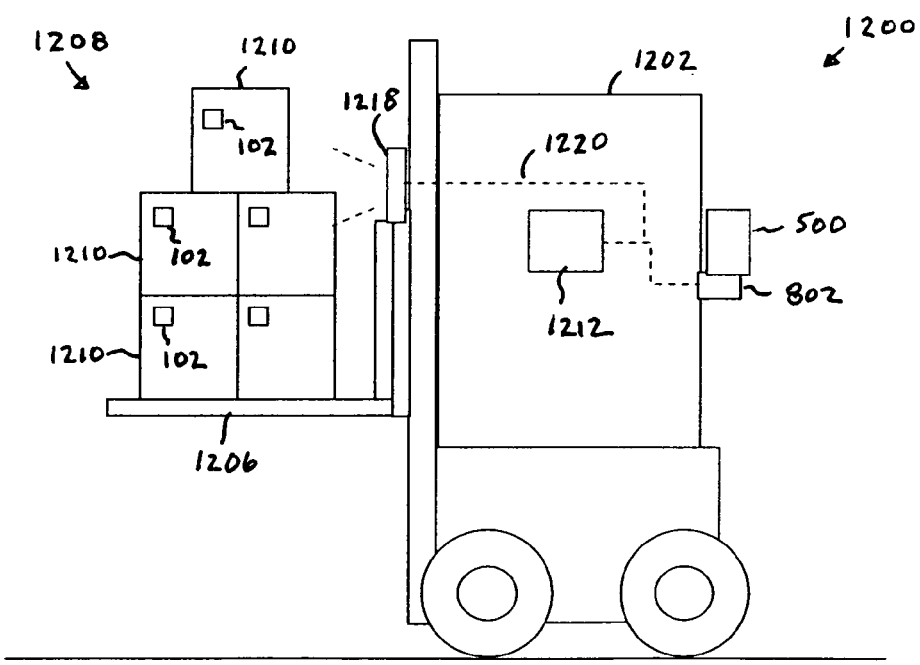

The configuration of antenna system 804 shown in FIG. 11 is typically a non-mobile or fixed position type RFID antenna system, although this configuration can alternatively be implemented in a mobile configuration. FIGS. 12A and 12B show an example mobile RFID communication system 1200, according to an embodiment of the present invention. As shown in FIGS. 12A and 12B, system 1200 is mounted on a mobile structure, shown as a forklift 1202. FIGS. 12A and 12B show front and side views of forklift 1202. As shown in FIG. 12B, forklift 1202 mounts docking station 802, and reader 500 is interfaced with docking station 802. In the front view of FIG. 12A, forks 1206 of forklift 1202 are shown at a near bottom position. In the side view of FIG. 12B, forks 1206 are shown raised to a middle position (with respect to FIG. 12A) and supporting a load 1208 of objects 1210. As shown in FIG. 12B, each of objects 1210 has a respective tag 102 attached thereto.

As shown in FIGS. 12A and 12B, forklift 1202 mounts a pair of side mounted antennas 1212 and 1214, and a pair of front mounted antennas 1216 and 1218. Side mounted antennas 1212 and 1214 may be used to read tags located alongside forklift 1202, such as tags of items on shelves adjacent to a path of forklift 1202. Front mounted antennas 1216 and 1218 may be used to read tags in front of forklift 1202, including tags 102 of objects 1210 carried by forks 1206. Antennas 1212, 1214, 1216, and 1218 are coupled to docking station 802 by an electrical signal link 1220, which may be include a coaxial cable and/or any other electrical connection suitable for transporting an RF signal.

When mobile reader 500 is not coupled with docking station 802 mounted to forklift 1202, reader 500 may be used by an operator to read tags within a read coverage area of antenna 506. The operator may carry mobile reader 500 from place to place as needed to read tags. When mobile reader 500 is docked with docking station 802, reader 500 is coupled to antennas 1212, 1214, 1216, and 1218. Thus, when docked, reader 500 may transmit communication signals using antennas 1212, 1214, 1216, and 1218 to read tags within a read coverage area of antennas 1212, 1214, 1216, and 1218. This may include tags associated with objects carried on forks 1206 and/or objects within a coverage area of antennas 1212, 1214, 1216, and 1218 of forklift 1202 as forklift 1202 travels within a work space (e.g., a warehouse, factory, retail area, etc.).

Figure 13A:
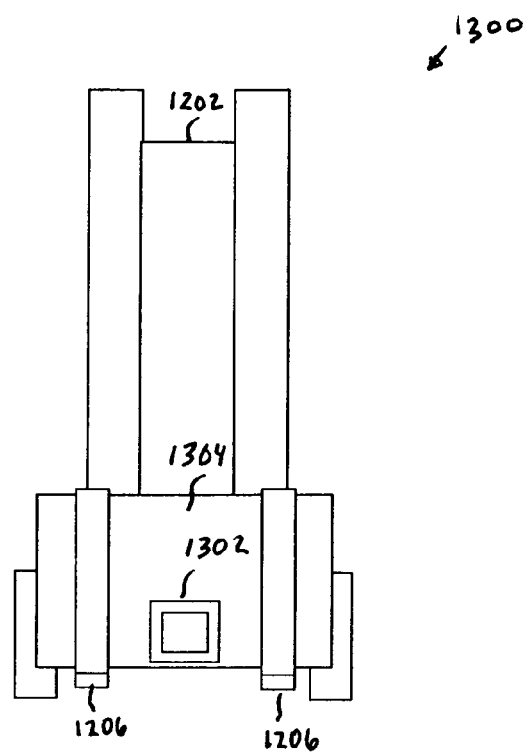
Figure 13B:
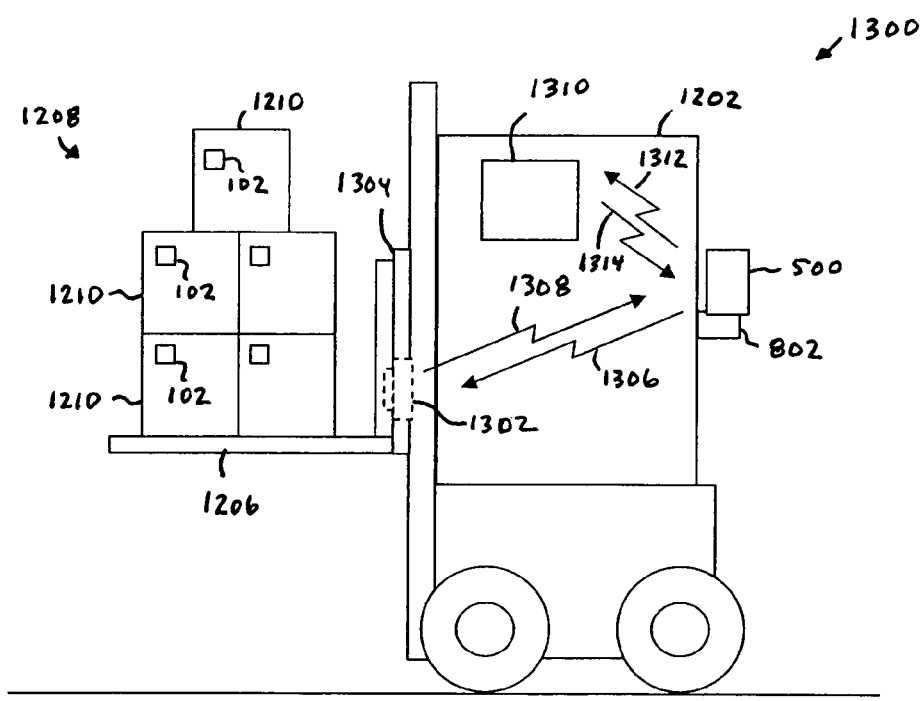

In a further embodiment, reader 500 may be configured to wirelessly communicate with other readers. For example, as shown in FIGS. 13A and 13B, a mobile structure, such as forklift 1202, may carry a second reader 1302 mounted to a back plate area 1304 of forklift 1202. Reader 1302 may be used to read tags 102 carried by forks 1206, for example. In an embodiment, reader 500 and reader 1302 each include a wireless communications module to communicate with the opposite reader in a wireless fashion. For example, the wireless communications module of reader 500 may be similar to network interface 216 of reader 104 shown in FIG. 2, and further described above. The wireless communications module may be configured to communicate according to various communications protocols, including Bluetooth, 802.11, and/or any others described elsewhere herein or otherwise known.

As shown in FIG. 13B, reader 500 may transmit a first communication signal 1306 to reader 1302. For example, first communication signal 1306 may direct reader 1302 to transmit a signal to read tags. Reader 1302 may transmit a second communication signal 1308 to reader 500. For example, second communication signal 1308 may include tag response data and/or other information. Reader 500 and reader 1302 may communicate for any purpose, as would be known by persons skilled in the relevant art(s).

Furthermore, reader 500 may be configured to wirelessly communicate with a computer system 1310 mounted to forklift 1202. Reader 500 may transmit a first communication signal 1312 to computer system 1310. For example, first communication signal 1312 may provide information from tags read by reader 500 (or by reader 1302) to computer system 1310. Computer system 1310 may transmit a second communication signal 1314 to reader 500. For example, second communication signal 1314 may include instructions from computer system 1310 to reader 500 and/or other information. Reader 500 and computer system 1310 may communicate for any purpose, as would be understood by persons skilled in the relevant art(s). Reader 1302 and computer system 1310 may also communicate with each other directly in a similar fashion.

Figure 14:
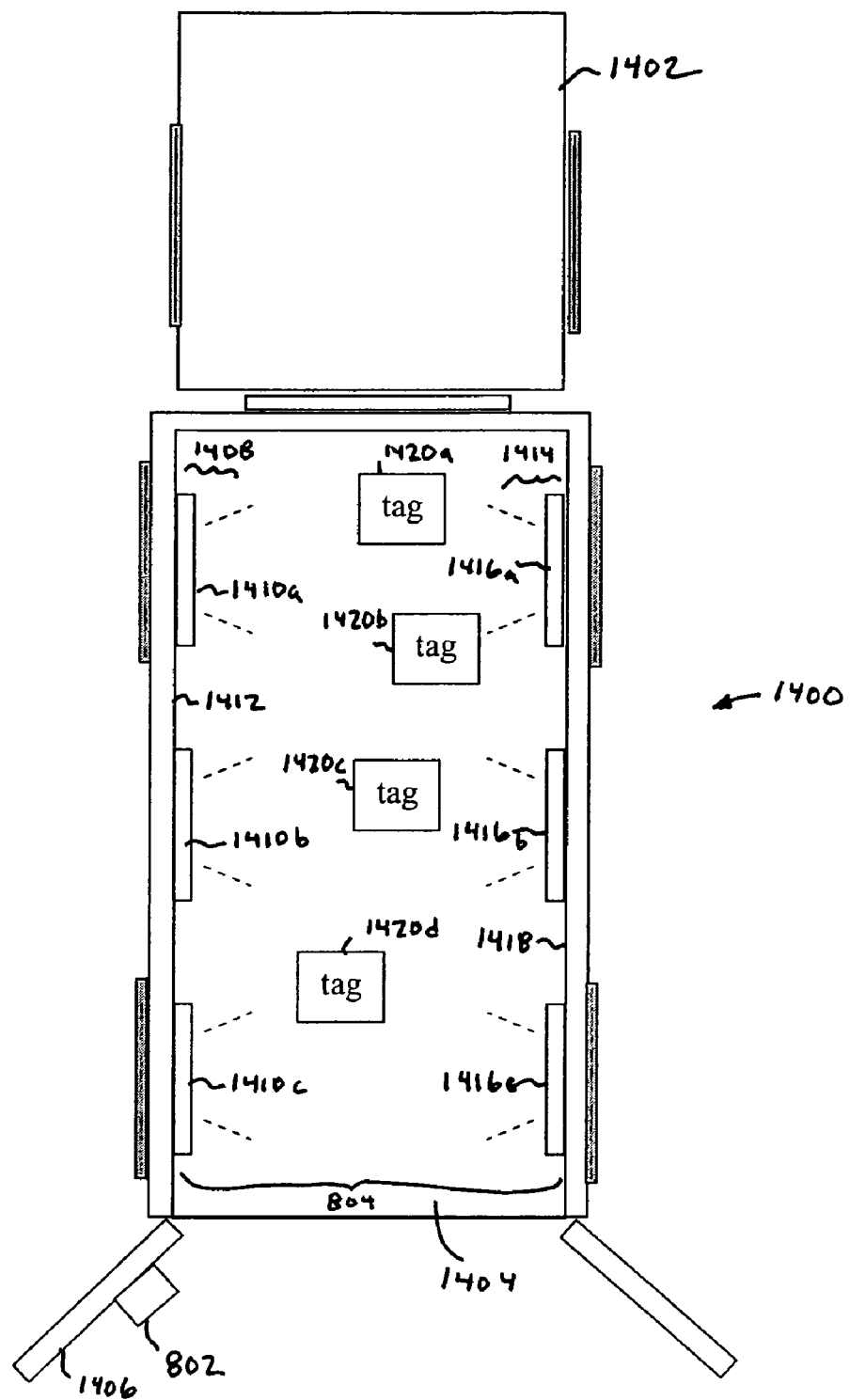

As described above, antenna system 804 can be implemented in mobile configurations. FIG. 14 shows an example mobile RFID communication system 1400, according to another mobile embodiment of the present invention. As shown in FIG. 14, system 1400 is mounted on a mobile structure, shown as a truck 1402.

In FIG. 14, reader 500 (not shown in FIG. 14) is configured to be detachably coupled with docking station 802 to access external antennas 804, which are mounted on walls, floor, and/or roof of a load area 1404 of truck 1402. Docking station 802 may be mounted anywhere on truck 1402, and is shown mounted to a rear door 1406 of truck 1402 for illustrative purposes. A first array of antennas 1408 of external antennas 804 includes antennas 1410a-1410c, which are mounted to a first wall 1412 inside load area 1404. A second array of antennas 1414 of external antennas 804 includes antennas 1416a-1416c, which are mounted to a second wall 1418 inside load area 1404. In an example implementation, first array of antennas 1408 and second array of antennas 1414 are mounted to opposing walls 1412 and 1418. In this manner, tags, such as tags 1420a-1420d, that are present in load area 1404 may be read. Tags 1420a-1420d may be read during or right after loading of their associated items in truck 1402, during transit by truck 1402, and/or prior to or during unloading from truck 1402.

When mobile reader 500 is not coupled with docking station 802, reader 500 may be used by an operator to read tags within a read coverage area of antenna 506. The operator may carry mobile reader 500 from place to place as needed to read tags. When mobile reader 500 is docked with docking station 802, reader 500 is coupled to antennas 1410a-1410c and 1416a-1416c. Thus, when docked, reader 500 may operate antennas 1410a-1410c and 1416a-1416c to read tags within a read coverage area of antennas 1410a-1410c and 1416a-1416c.

Note that antennas of external antennas 804 may be coupled to reader 500 and/or each other by an electrical signal link in any manner. For example, a coaxial cable may couple docking station 802 to antennas 1410a-1410c and 1416a-1416c in a daisy chain or star configuration, with proper impedance matching and terminations implemented.

Various embodiments of the present invention provide advantages. For example, a mobile reader may be used by an operator to "hand" read tags. Furthermore, the mobile reader may be carried by the operator from location to location to be interfaced with antenna systems (e.g., "dumb antenna farms") that are pre-arranged to read tags in coverage areas of the antenna systems. The reader electronics (the mobile reader) are only needed to be located at "in work" locations, where tags currently need to be read, and are not required to be present at locations where there tags are not present or needing to be read. Thus, a single mobile reader can be used to drive antenna systems at different locations at different times, rather than having separate readers present at each of the different locations at all times. This can significantly reduce costs, allowing an entity to purchase and use fewer readers to provide coverage for the facilities of the entity.

Example Computer System Embodiments

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention are implemented using software, the software may be stored in a computer program product and loaded into a computer system using a removable storage drive, hard drive, or communications interface. The control logic (software), when executed by a processor, causes the processor to perform the functions of the invention as described herein.

According to an example embodiment, a reader may execute computer-readable instructions to initiate generation of communications signals to communicate with a tag, to process tag responses, etc.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A radio frequency identification (RFID) reader, comprising:
    a first antenna;
    an antenna interface coupled to the first antenna;
    a transceiver coupled to the antenna interface, wherein the transceiver is configured to generate a communication signal to communicate with at least one RFID tag;
    a docking interface coupled to the antenna interface, wherein the docking interface is configured to detachably interface the reader with a docking station, the docking station including a contact member coupled to at least one additional antenna; and
    a housing that contains the transceiver, the antenna interface, and the docking interface, wherein the docking interface is accessible at an external surface of the housing;
    wherein the antenna interface is configured to couple the communication signal to the first antenna when the reader is detached from the docking station, to enable the first antenna to transmit the communication signal; and
    wherein the antenna interface is configured to couple the communication signal to the contact member when the docking interface is interfaced with the docking station, to enable the at least one additional antenna to transmit the communication signal.

2. The RFID reader of claim 1, wherein the docking station comprises a switch that is configured to cause the antenna interface to couple the communication signal to the first antenna when the reader is detached from the docking station, and to couple the communication signal to the contact member when the docking interface is interfaced with the docking station.

3. The RFID reader of claim 1, wherein the switch is a push-to-make or push-to-break switch.

4. The REID reader of claim 1, wherein the housing is configured to be handheld.

5. The REID reader of claim 1, wherein the first antenna is mounted externally to the housing.

6. The REID reader of claim 1, wherein the first antenna is mounted internally to the housing.

7. The REID reader of claim 1, wherein the docking interface includes a first coaxial cable connector, wherein the contact member includes a second coaxial cable member, wherein the first coaxial cable connector and second coaxial cable connector are connected when the docking interface is interfaced with the docking station.

8. The REID reader of claim 1, wherein the antenna interface is configured to couple a response signal received by the first antenna to the transceiver when the reader is detached from the docking station; and wherein the antenna interface is configured to couple to the transceiver a response signal received by the at least one additional antenna and coupled to the contact member when the docking interface is interfaced with the docking station.

9. The REID reader of claim 1, wherein the docking station is mounted to an immobile object.

10. The REID reader of claim 1, wherein the docking station is mounted to a mobile object.

11. The REID reader of claim 10, wherein the mobile object is a forklift.

12. The REID reader of claim 10, wherein the mobile object is a truck.

13. The RFJD reader of claim 1, further comprising:
a wireless communication module configured to communicate with a second reader.

14. An antenna system, comprising:
a plurality of antennas;
an electrical signal link coupled to the plurality of antennas in a series topology; and
a docking station configured to detachably interface with a handheld reader, the docking station including a first contact member coupled to the electrical signal link;
wherein the docking station is configured to couple the first contact member to a second contact member of the handheld reader when the docking station is interfaced with the handheld reader.

15. The antenna system of claim 14, wherein the docking station is configured to couple the first contact member to the second contact member when the docking station is interfaced with the handheld reader to enable the handheld reader to conduct a communication signal to at least one antenna in the plurality of antennas to be transmitted by the at least one antenna.

16. The antenna system of claim 14, wherein the docking station is configured to couple the first contact member to the second contact member when the docking station, is interfaced with the handheld reader to enable a response signal received by at least one antenna in the plurality of antennas to be coupled to the handheld reader.

17. The antenna system of claim 14, wherein the electrical signal link couples the plurality of antennas in a ring topology.

18. The antenna system of claim 14, wherein the electrical signal link couples the plurality of antennas in a star topology.

19. The antenna system of claim 14, wherein the electrical signal link comprises a coaxial cable.

20. The antenna system of claim 14, wherein the docking station and at least one antenna are mounted to at least one immobile object.

21. The antenna system of claim 14, wherein the docking station and at least one antenna are mounted to a mobile object.

22. The antenna system of claim 21, wherein the mobile object is a forklift.

23. The antenna system of claim 21, wherein the mobile object is a truck.

24. A method for communicating with radio frequency identification (RFID) tags using an RFID reader, comprising:
generating a first communication signal confignred to communicate with at least one RFID tag;
transmitting the first communication signal from a first antenna of the reader; and
docking the reader with a docking station, the docking station including a contact member coupled to at least one additional antenna;
said docking the reader with the docking station enabling the reader to couple a second communication signal through the contact member to the at least one additional antenna.

25. The method of claim 24, wherein said docking the reader with the docking station disables the reader from transmitting the second communication signal from the first antenna.

26. The method of claim 24, further comprising:
generating the second communication signal, wherein the second communication signal is configured to communicate with at least one RFID tag;
coupling the second communication signal through the contact member to the at least one additional antenna; and
transmitting the second communication signal from the at least one additional antenna.

27. The method of claim 25, further comprising:
undocking the reader from the docking station, said undocking the reader from the docking station enabling the reader to transmit a third communication signal from the first antenna.

28. The method of claim 27, wherein said undocking the reader from the docking station disables the reader from coupling the third communication signal through the contact member to the at least one additional antenna.

29. A method for communicating with radio frequency identification (RFID) tags using an RFID reader, said reader including a first antenna, comprising:
docking the reader with a docking station, the docking station including a contact member coupled to at least one additional antenna;
said docking the reader with the docking station enabling the reader to couple a communication signal through the contact member to the at least one additional antenna,
wherein said docking the reader with the docking station disables the reader from transmitting the communication signal from the first antenna.

30. The method of claim 29, further comprising:
generating the communication signal, wherein the communication signal is configured to communicate with at least one RFID tag;
coupling the communication signal through the contact member to the at least one additional antenna; and
transmitting the communication signal from the at least one additional antenna.

31. The method of claim 29 further comprising:
undocking the reader from the docking station, said undocking the reader from the docking station enabling the reader to transmit a second communication signal from the first antenna.

32. The method of claim 31, wherein said undocking the reader from the docking station disables the reader from coupling the second communication signal through the contact member to the at least one additional antenna.

33. A system for communicating with radio frequency identification (RFID) tags, comprising:
means for generating a first communication signal configured to communicate with at least one RFID tag;
means for transmitting the first communication signal from a reader;
means for docking the reader with a docking station; and
means for enabling the reader to couple a second communication signal to at least one additional antenna through the docking station.

* * * * *

UNITED STATES PATENT AND TRADEMARK OFFICE
CERTIFICATE OF CORRECTION

| | | |
|---|---|---|
| PATENT NO. | : 7,696,875 B2 | Page 1 of 1 |
| APPLICATION NO. | : 11/589916 | |
| DATED | : April 13, 2010 | |
| INVENTOR(S) | : Wulff | |

It is certified that error appears in the above-identified patent and that said Letters Patent is hereby corrected as shown below:

IN THE CLAIMS

In Column 14, Line 52, in Claim 4, delete "REID" and insert -- RFID --, therefor.

In Column 14, Line 54, in Claim 5, delete "REID" and insert -- RFID --, therefor.

In Column 14, Line 56, in Claim 6, delete "REID" and insert -- RFID --, therefor.

In Column 14, Line 58, in Claim 7, delete "REID" and insert -- RFID --, therefor.

In Column 14, Line 64, in Claim 8, delete "REID" and insert -- RFID --, therefor.

In Column 15, Line 6, in Claim 9, delete "REID" and insert -- RFID --, therefor.

In Column 15, Line 8, in Claim 10, delete "REID" and insert -- RFID --, therefor.

In Column 15, Line 10, in Claim 11, delete "REID" and insert -- RFID --, therefor.

In Column 15, Line 12, in Claim 12, delete "REID" and insert -- RFID --, therefor.

In Column 15, Line 14, in Claim 13, delete "RFJD" and insert -- RFID --, therefor.

In Column 15, Line 36, in Claim 16, delete "station," and insert -- station --, therefor.

In Column 15, Line 59, in Claim 24, delete "confignred" and insert -- configured --, therefor.

In Column 16, Line 45, in Claim 31, delete "29" and insert -- 29, --, therefor.

Signed and Sealed this
Fifteenth Day of May, 2012

David J. Kappos
*Director of the United States Patent and Trademark Office*